United States Patent
Fukudome

(10) Patent No.: US 10,422,300 B2
(45) Date of Patent: Sep. 24, 2019

(54) RADIANT HEAT RECOVERY HEATER, AND STIRLING ENGINE AND COMBUSTION FURNACE USING RADIANT HEAT RECOVERY HEATER

(71) Applicant: YANMAR CO., LTD., Osaka-shi (JP)

(72) Inventor: Jiro Fukudome, Osaka (JP)

(73) Assignee: YANMAR CO., LTD., Osaka (JP)

( * ) Notice: Subject to any disclaimer, the term of this patent is extended or adjusted under 35 U.S.C. 154(b) by 161 days.

(21) Appl. No.: 15/319,809

(22) PCT Filed: Jun. 2, 2015

(86) PCT No.: PCT/JP2015/065917
§ 371 (c)(1),
(2) Date: Dec. 19, 2016

(87) PCT Pub. No.: WO2015/194365
PCT Pub. Date: Dec. 23, 2015

(65) Prior Publication Data
US 2017/0138301 A1    May 18, 2017

(30) Foreign Application Priority Data

Jun. 20, 2014 (JP) ................................. 2014-126861
Jun. 20, 2014 (JP) ................................. 2014-126862

(51) Int. Cl.
*F02G 1/055* (2006.01)
*F02G 1/043* (2006.01)
(Continued)

(52) U.S. Cl.
CPC .............. *F02G 1/055* (2013.01); *F01K 27/02* (2013.01); *F02G 1/043* (2013.01); *F23G 5/46* (2013.01);
(Continued)

(58) Field of Classification Search
CPC ...... F02G 1/043; F02G 1/055; F02G 2254/20; F02G 2254/50; F02G 2255/00;
(Continued)

(56) References Cited

U.S. PATENT DOCUMENTS 3,817,322 A * 6/1974 Asselman ................. F01K 3/00
                                                            165/104.26
4,052,854 A * 10/1977 du Pre ..................... F02G 1/055
                                                            165/104.14
(Continued)

FOREIGN PATENT DOCUMENTS

JP        53-063068 U      5/1978
JP        54162042 A *    12/1979 ............. F02G 1/055
(Continued)

OTHER PUBLICATIONS

Supplementary Search Report dated Jun. 22, 2017, issued for the European patent application No. 15810616.1.
(Continued)

*Primary Examiner* — Mark A Laurenzi
*Assistant Examiner* — Xiaoting Hu
(74) *Attorney, Agent, or Firm* — Norton Rose Fulbright US LLP

(57) ABSTRACT

A radiant heat recovery heater includes U-shaped heat transfer tubes each including a first path and a second path arranged on a mounting section. The U-shaped heat transfer tubes are housed in a container fixed to the mounting section. The first paths and the second paths of the U-shaped heat transfer tubes are arranged on the mounting section at equal intervals with a pitch angle θ. The first paths are each arranged on the mounting section at a position offset from the pitch angle θ for the associated second path by a predetermined angle α, so as not to completely overlap a (Continued)

projection of that second path, the projection extending from the container toward the center C of the container.

18 Claims, 11 Drawing Sheets

(51) Int. Cl.
  *F23G 5/46* (2006.01)
  *F28D 21/00* (2006.01)
  *F01K 27/02* (2006.01)
(52) U.S. Cl.
  CPC ........ *F28D 21/001* (2013.01); *F02G 2254/15* (2013.01); *F02G 2254/20* (2013.01); *F02G 2254/50* (2013.01); *F02G 2255/00* (2013.01); *Y02E 20/12* (2013.01)
(58) Field of Classification Search
  CPC ............. F02G 2255/10; F02G 2255/20; F02G 2254/00; F02G 2254/05; F02G 2254/10; F02G 2254/11; F02G 2254/15; F02G 2254/30; F02G 2254/90; F28D 21/001; F23G 5/46; Y02E 20/12
  See application file for complete search history.

(56) References Cited

U.S. PATENT DOCUMENTS

| | | | |
|---|---|---|---|
| 5,711,232 A * | 1/1998 | Yamaguro | ............... F02G 1/055 110/212 |
| 5,884,481 A | 3/1999 | Johansson et al. | |

FOREIGN PATENT DOCUMENTS

| | | | | |
|---|---|---|---|---|
| JP | 55-93939 A | | 7/1980 | |
| JP | 58-122343 A | | 7/1983 | |
| JP | 58117336 A | * | 7/1983 | ............. F02G 1/055 |
| JP | 62126252 A | * | 6/1987 | ............. F02G 1/055 |
| JP | 64-88021 A | | 4/1989 | |
| JP | 06-010763 A | | 1/1994 | |
| JP | 06-193806 A | | 7/1994 | |
| JP | 2564849 B2 | | 12/1996 | |
| JP | 2000-216313 A | | 8/2000 | |
| JP | 2013-195001 A | | 9/2013 | |
| WO | 99/02841 A1 | | 1/1999 | |

OTHER PUBLICATIONS

International Search Report dated Aug. 18, 2015, issued for PCT/JP2015/065917.

* cited by examiner (a)

(b)

(a)

(b)

RADIANT HEAT RECOVERY HEATER, AND STIRLING ENGINE AND COMBUSTION FURNACE USING RADIANT HEAT RECOVERY HEATER

TECHNICAL FIELD

The present invention relates to radiant heat recovery heaters, Stirling engines including a radiant heat recovery heater as a high-temperature-side heat exchanger, and combustion furnaces that recovers heat by means of a radiant heat recovery heater.

BACKGROUND ART

It has been conventionally known (see, for example, Patent Document 1) that some Stirling engines include a high-temperature heat exchanger exposed in a combustion furnace.

CITATION LIST

Patent Documents

Patent Document 1: JP 2564849 B

SUMMARY OF INVENTION

Technical Problem

No documents, however, disclose a specific structure for increased heat exchange performance of the conventional high-temperature heat exchanger.

The present invention, conceived in view of this problem, has an object to provide a radiant heat recovery heater for enhanced heat exchange performance and also to provide a Stirling engine and a combustion furnace using such a radiant heat recovery heater.

Solution to Problem

The present invention, in order to solve the problem, is directed to a radiant heat recovery heater including a plurality of heat transfer tubes arranged on a mounting section of the radiant heat recovery heater, the heat transfer tubes each including an outward path and a return path for a heat medium, wherein: first paths are arranged to form an arrangement pitch circle having a small diameter, and second paths are arranged to form an arrangement pitch circle having a large diameter; the heat transfer tubes are housed in a container; the heat transfer tubes absorb radiant heat from the container when the container is exposed to high temperature; the first paths and the second paths of the heat transfer tubes are arranged on the mounting section at equal intervals with a pitch angle; and the first paths are each arranged on the mounting section at a position offset from the pitch angle of the associated second path by half the pitch angle, so as not to completely overlap a projection of that second path, the projection extending from the container toward a center of the container.

In this radiant heat recovery heater, the first paths may be each arranged on the mounting section at a position offset from the associated second path by an angle that is half the pitch angle.

The present invention, in order to solve the problem, is also directed to a radiant heat recovery heater including a plurality of heat transfer tubes arranged on a mounting section of the radiant heat recovery heater, the heat transfer tubes each including an outward path and a return path for a heat medium, wherein: first paths are arranged to form an arrangement pitch circle having a small diameter, and second paths are arranged to form an arrangement pitch circle having a large diameter; the heat transfer tubes are housed in a container; the heat transfer tubes absorb radiant heat from the container when the container is exposed to high temperature; and the first paths of the heat transfer tubes arranged to form a pitch circle having a small diameter include flatly or elliptically processed parts enlarged along a projection, to increase a projection area extending from the container toward a center of the container.

In this radiant heat recovery heater, the container may be filled with an inert gas.

The radiant heat recovery heater may further include an inert gas supply path for supplying the inert gas into the container.

In the radiant heat recovery heater, the inert gas may contain helium.

In the radiant heat recovery heater, the container may be sealed so that the container can maintain an interior thereof at a pressure higher than atmospheric pressure when the container is exposed to high temperature.

The radiant heat recovery heater may further include a pressure regulation valve.

The present invention, in order to solve the problem, is also directed to a Stirling engine including the radiant heat recovery heater as a high-temperature-side heat exchanger.

The present invention, in order to solve the problem, is also directed to a combustion furnace including the radiant heat recovery heater exposed to an empty space inside the combustion furnace in which heat recovery is possible.

Advantageous Effects of Invention

As described above, according to the present invention as described in claim 1, the first paths and the second paths of the heat transfer tubes are arranged on the mounting section at equal intervals with a pitch angle, and the first paths are each arranged on the mounting section at a position offset from the pitch angle of the associated second path by a predetermined angle, so as not to completely overlap a projection of that second path, the projection extending from the container toward a center of the container. Therefore, the present invention can prevent the radiant heat radiated from the container toward the first paths from being blocked by the second paths, which can increase the amount of heat directly transferred from the container to the heat transfer tubes.

According to the present invention as described in claim 2, the first paths are each arranged on the mounting section at a position offset from the associated second path by an angle that is half the pitch angle. The present invention can therefore maximize the increase of the amount of the directly transferred heat.

According to the present invention as described in claim 3, the first paths and/or the second paths of the heat transfer tubes include flatly or elliptically processed parts along a projection, to increase a projection area extending from the container toward a center of the container. The present invention can therefore increase the amount of heat directly transferred from the container to the transfer tubes over a configuration where no such processed parts are formed.

According to the present invention as described in claim 4, the container, housing the heat transfer tubes, is filled with an inert gas. The present invention can therefore reduce high temperature oxidation of the heat transfer tubes and thus protect the heat transfer tubes, which can give improved durability to the heat transfer tubes. In addition, according to the present invention as described in claim 5, the radiant heat recovery heater further includes an inert gas supply path for supplying the inert gas into the container. The present invention can therefore readily replace air inside the container with the inert gas.

According to the present invention as described in claim 6, the inert gas contain helium. The present invention can therefore reduce high temperature oxidation of the heat transfer tubes and also increase a natural-convection-based heat transfer amount in the container, which in turn can improve the durability and heat transfer efficiency of the heat transfer tubes.

According to the present invention as described in claim 7, the container is sealed so that the container can maintain an interior thereof at a pressure higher than atmospheric pressure when the container is exposed to high temperature. Therefore, the present invention can further reduce high temperature oxidation of the heat transfer tubes and also increase a natural-convection-based heat transfer amount in the container, which in turn can improve the durability and heat transfer efficiency of the heat transfer tubes. In addition, the present invention as described in claim 8 can prevent excessively high internal pressure.

The Stirling engine as described in claim 9 includes the radiant heat recovery heater as a high-temperature-side heat exchanger. The Stirling engine can therefore increase the amount of heat recovered by the high-temperature-side heat exchanger.

The combustion furnace as described in claim 10 includes the radiant heat recovery heater exposed to an empty space inside the combustion furnace in which heat recovery is possible. The combustion furnace can therefore efficiently recover waste heat therein.

DESCRIPTION OF EMBODIMENTS

The following will describe embodiments of the present invention in reference to drawings.

Figure 1:
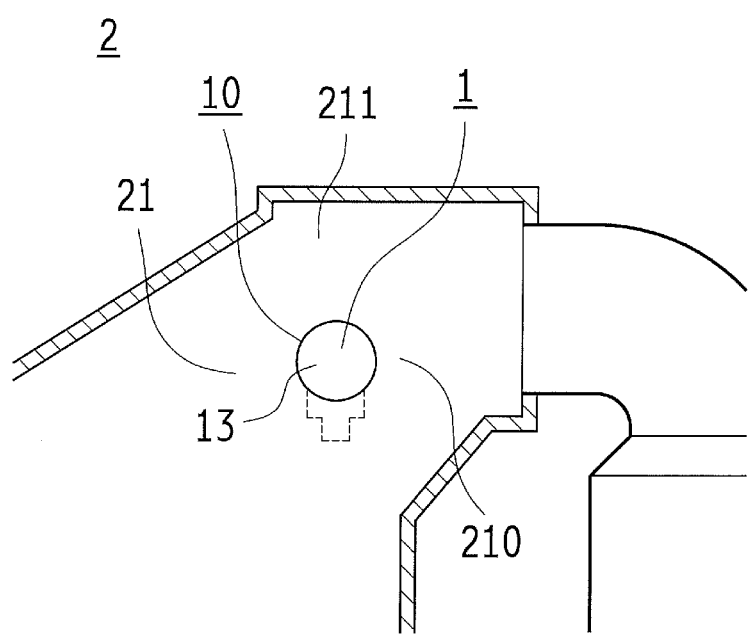
FIG. 1 is a partial cross-sectional view of a combustion furnace in which there is disposed a Stirling engine including a radiant heat recovery heater in accordance with the present invention.
Figure 2:
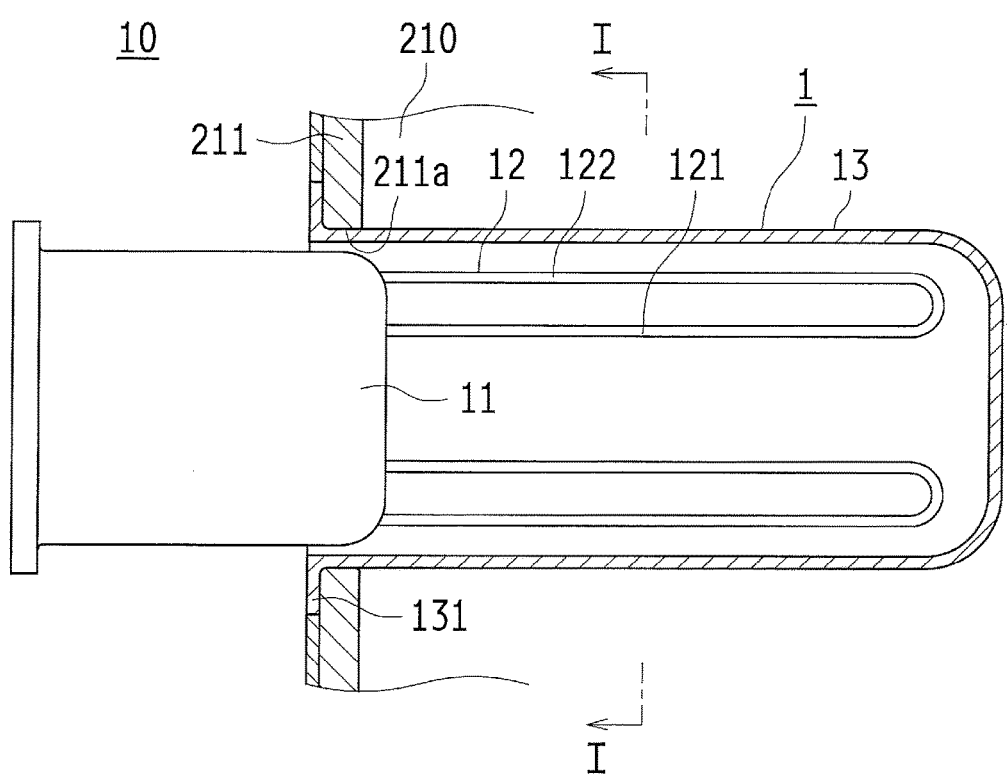
FIG. 2 is a partial end view showing a combustion furnace in which there is disposed a Stirling engine including a radiant heat recovery heater in accordance with the present invention.
Figure 3:
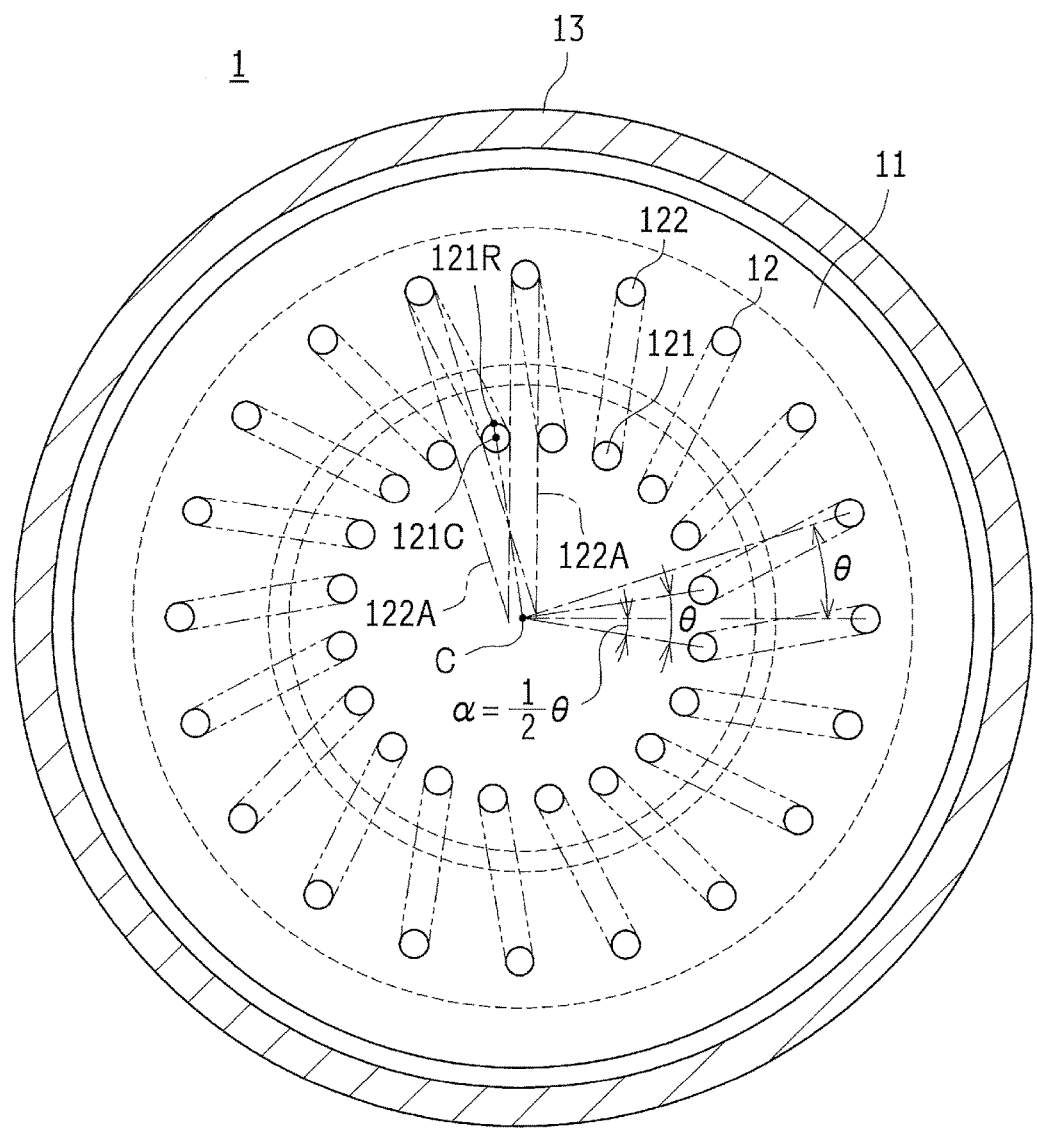
FIG. 3 is a cross-sectional view taken along line I-I in FIG. 2.

FIG. 1 shows a combustion furnace 2 in which there is disposed a Stirling engine 10 including a radiant heat recovery heater 1. FIG. 2 shows the Stirling engine 10 in the combustion furnace 2. FIG. 3 shows major parts of the radiant heat recovery heater 1 in the Stirling engine 10.

The radiant heat recovery heater 1 in accordance with the present invention is equipped with a plurality of U-shaped heat transfer tubes 12 disposed in a radial arrangement on a mounting section 11 of the heater 1. The U-shaped heat transfer tubes 12 are housed in a container 13, which is exposed to high temperature so that the U-shaped heat transfer tubes 12 can absorb radiant heat from the container 13.

The mounting section 11 is shaped like a disc and in the present embodiment, constitutes a high-temperature-side cylinder head for the Stirling engine 10. The U-shaped heat transfer tubes 12 are disposed in a radial manner around the center C of the mounting section 11.

The U-shaped heat transfer tubes 12 are each shaped like a letter "U" with a bend to provide an outward and a return path for a heat medium. Either the outward paths or the return paths ("first paths") 121 are arranged to form an arrangement pitch circle having a small diameter, whereas the other paths ("second paths") 122 are arranged to form an arrangement pitch circle having a large diameter. The U-shaped heat transfer tubes 12 are disposed at equal intervals with a pitch angle $\theta$ around the center C of the mounting section 11. The first path 121, located closer to the center C, is arranged on the mounting section 11 at an angular position, $\alpha$, offset from the position of the second path 122 by an angle of $\frac{1}{2}\theta$, which is half the pitch angle $\theta$, so as not to completely overlap a projection 122A of the second path 122, the projection 122A extending toward the center C from the circumference where the container 13 will be located.

The container 13 has such a bottomed cylindrical shape that all the radially disposed, U-shaped heat transfer tubes 12 can be housed therein. The container 13 is so disposed that when the U-shaped heat transfer tubes 12 are housed in the container 13, there remains a gap between the opening rim of the container 13 and the mounting section 11 for the following reason. The container 13 is exposed to high temperature and hence experiences significant temperature changes during use. If the container 13 is fixed tightly to the mounting section 11 and exposed to high temperature during use, the internal pressure of the container 13 may become too high, possibly causing thermal strain in, and hence damaging, the container 13. The U-shaped heat transfer tubes 12 are contained in the container 13 with a gap between the container 13 and the mounting section 11, so that the U-shaped heat transfer tubes 12 can absorb radiant heat from the container 13 without the container 13 being deformed due to temperature changes. The container 13 is made of a metal such as stainless steel, a ceramic, or a heat-resistant material such as cermet.

The radiant heat recovery heater 1 configured as described above is used as a high-temperature-side heat exchanger for the Stirling engine 10. The Stirling engine 10 is not limited in any particular manner as long as it is capable of using heat recovered from the radiant heat recovery heater 1 as a high-temperature-side heat source for the Stirling engine 10. The Stirling engine 10 may be of any one of various types of them that are suitable for the amount of the heat recovered from the radiant heat recovery heater 1.

The combustion furnace 2 is configured to permit the high-temperature combustion gas produced by combustion of materials to pass through the combustion furnace 2 for desulfurization, dedusting, and other processes before being vented through a gas flue. The Stirling engine 10 is disposed so as to enable the following actions and structure: (i) the container 13 (including associated parts thereof) of the radiant heat recovery heater 1 of the Stirling engine 10 can be inserted through an opening 211*a* in a sidewall section 211 of, for example, a secondary combustion furnace 21 through which the high-temperature combustion gas passes, (ii) the opening 211*a* can then be closed by a flange section 131 of the container 13, and (iii) the container 13 (including associated parts thereof) can be exposed in an empty space 210 inside the secondary combustion furnace 21. Note that the Stirling engine 10 is not necessarily located on the sidewall section 211 inside the secondary combustion furnace 21 and may be provided at any location inside the combustion furnace 2 through which the high-temperature combustion gas passes and alternatively at any location inside the combustion furnace 2 at which the radiant heat recovery heater 1 can be exposed to a high-temperature empty space, such as on a ceiling section inside the secondary combustion furnace 21 or an outlet gas flue of the combustion furnace 2.

As a result of the Stirling engine 10 being located in this manner on the sidewall section 211 of the secondary combustion furnace 21 of the combustion furnace 2, the radiant heat recovery heater 1 exposed to the empty space 210 inside the secondary combustion furnace 21 receives combustion heat inside the secondary combustion furnace 21 of the combustion furnace 2. The whole container 13 is thus heated. The U-shaped heat transfer tubes 12, housed in the container 13, are heated by radiant heat from the container 13.

For each U-shaped heat transfer tube 12, the first path 121, located closer to the center C, is arranged on the mounting section 11 at an angular position, α, offset from the position of the second path 122 by an angle of ½θ, which is half the pitch angle θ, so that the first path 121, located closer to the center C, does not completely overlap the projection 122A of the second path 122, the projection 122A extending from the container 13 toward the center C. The radiant heat from the container 13 reaches the first path 121 without being blocked by the second path 122; the entire U-shaped heat transfer tube 12 can receive the radiant heat.

Therefore, the radiant heat recovery heater 1 exhibits improved heat exchange efficiency and is prevented from developing a heat spot due to radiant heat concentrated on a particular part of the U-shaped heat transfer tube 12, which can add to the durability of the U-shaped heat transfer tube 12.

Note that the first path 121, located closer to the center C, is not necessarily arranged as described above on the mounting section 11 at a position offset from the position of the second path 122 by an angle of α, which is half the pitch angle θ (=½θ) as long as the first path 121, located closer to the center C, does not completely overlap the projection 122A of the second path 122, the projection 122A extending from the container 13 toward the center C. Alternatively, the first path 121 may be arranged on the mounting section 11 at a position offset by a very small angle of α. Nevertheless, as the first path 121 is prevented from completely overlapping the projection 122A of the second path 122 by an extra degree, the radiant heat receiving surface increases progressively, and the radiant heat recovery efficiency hence increases progressively. It hence follows that for maximum effects, the first path 121 should be arranged on the mounting section 11 at an angle α offset from the position of the second path 122 by an angle of α, which is half the pitch angle θ (=½θ).

Figure 4:
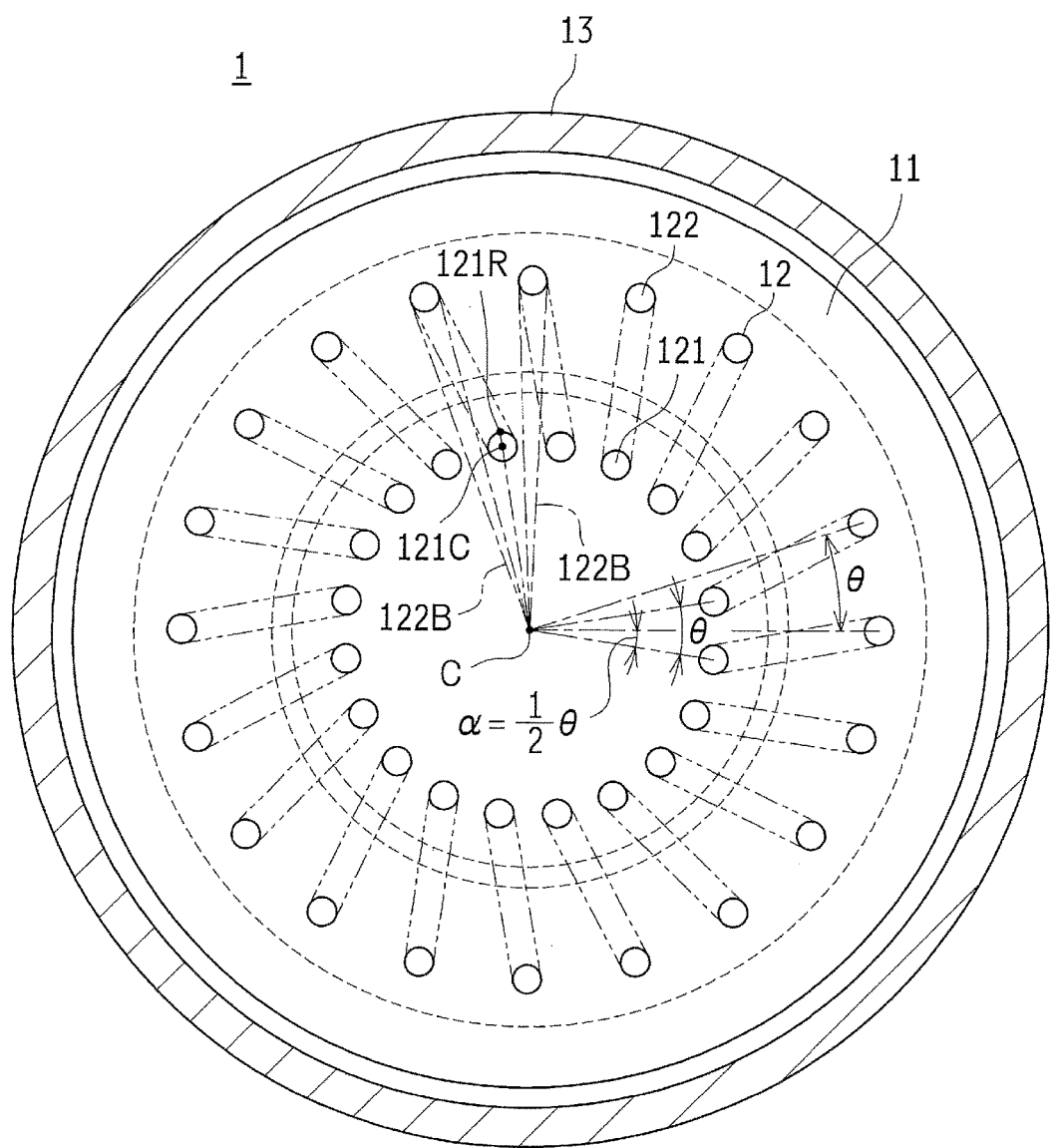
FIG. 4 is a cross-sectional view illustrating another projection for FIG. 3.

In the present embodiment, the first path 121 is arranged so as not to completely overlap the projection 122A of the second path 122, the projection 122A extending from the container 13 toward the center C. Alternatively, the first path 121 may be arranged as illustrated in FIG. 4 so as not to completely overlap a projection 122B of the second path 122, the projection 122B converging toward the center C from the container 13. Specifically, the container 13 has a circular exterior such that the container 13 radiates heat not in one direction, but in all directions along the circumference thereof. Therefore, even when the first path 121 overlaps the projection 122A of the second path 122, the projection 122A extending from the container 13 toward the center C, the first path 121 can absorb radiant heat that travels around from the circumference of the container 13 if the first path 121 is arranged not to overlap the projection 122B of the second path 122, the projection 122B converging toward the center C from the container 13. The entire first path 121 of the U-shaped heat transfer tube 12 can thus receive the radiant heat.

In addition, the first path 121 receives radiant heat from the container 13 right on the front thereof at a point 121R where the straight line linking the center C to a center 121C of the first path 121 intersects an outer half of the circumference of the first path 121 as illustrated in FIG. 3. Taking absorption of the radiant heat into account, the offset angle α is set preferably so that the point 121R does not overlap the projection 122A of the second path 122, the projection 122A extending from the container 13 toward the center C, and more preferably so that the point 121R does not overlap the projection 122B of the second path 122, the projection 122B converging toward the center C from the container 13, as illustrated in FIG. 4.

The angle α is allowed an progressively smaller adjustment range with an increase in the number of the U-shaped heat transfer tubes 12 mounted on the mounting section 11. When the number of the U-shaped heat transfer tubes 12 is increased, the most preferred structure that takes absorption of the radiant heat into account is again to arrange the first path 121, located closer to the center C, at a position offset from the position of the second path 122 by the angle of α, which is half the pitch angle θ (=½θ) because this arrangement can minimize the overlapping of the first path 121, located closer to the center C, and the projection 122B of the second path 122, the projection 122B converging toward the center C from the container 13.

Conversely, if the number of the U-shaped heat transfer tubes 12 mounted on the mounting section 11 is decreased, the offset angle α is allowed a progressively greater tolerance. In such a case, for each U-shaped heat transfer tube 12, the first path 121, located closer to the center C, is not necessarily arranged on the mounting section 11 at a position offset from the position of the second path 122 by the angle of α, which is half the pitch angle θ (=½θ). Alternatively, the offset angle α may be changed by any amount as long as the first path 121, located closer to the center C, does not overlap the projections 122A, 122B of the second path 122.

Figure 5:
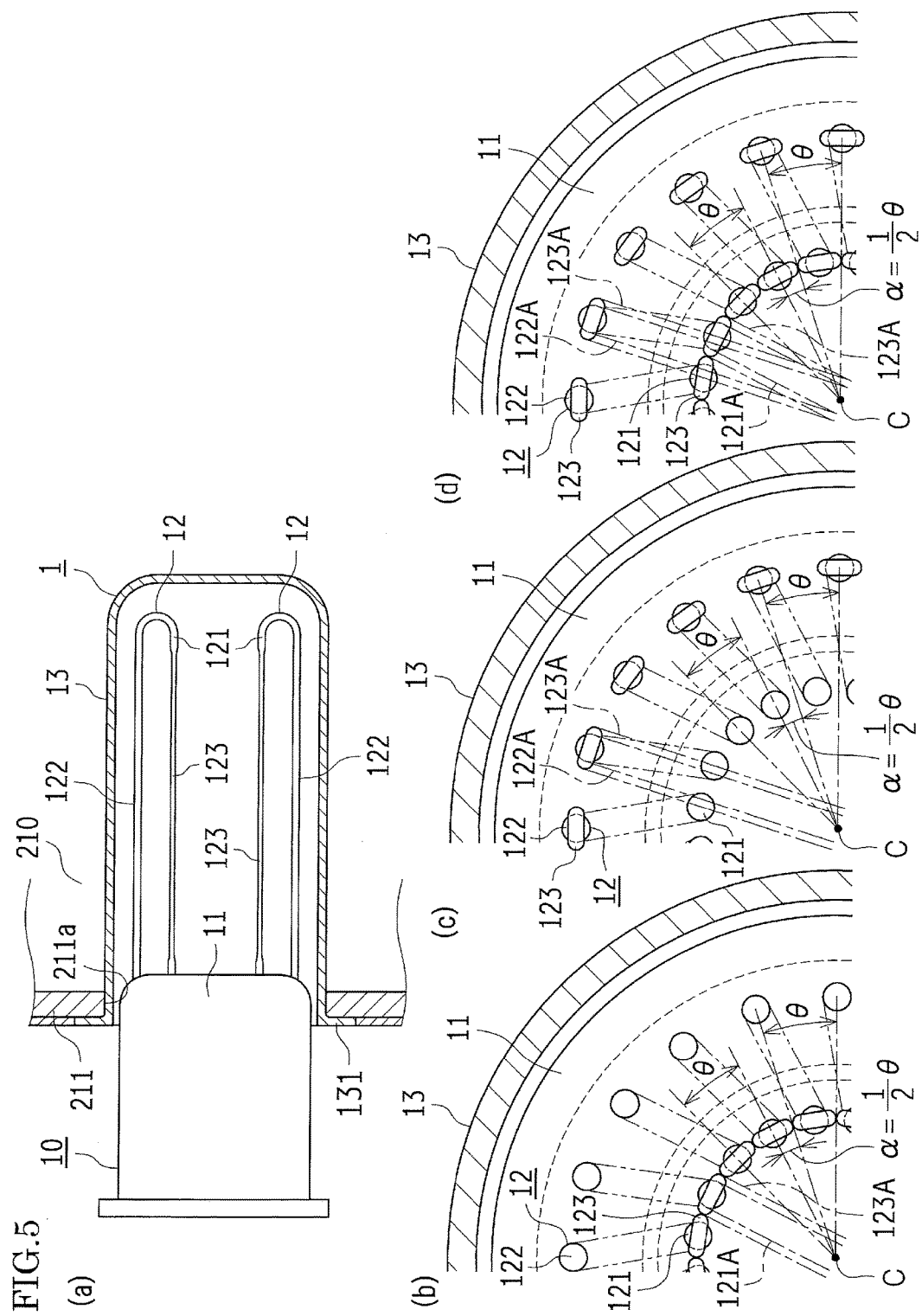
FIGS. 5(a) and 5(b) are a partial end view and a partial cross-sectional view, respectively, of another embodiment of the radiant heat recovery heater in accordance with the present invention.
FIGS. 5(c) and 5(d) are partial cross-sectional views of yet another embodiment for FIG. 5(b).

FIG. 5 illustrates other embodiments of the radiant heat recovery heater 1 in accordance with the present invention. Specifically, this radiant heat recovery heater 1 has a flatly or elliptically processed part 123 in a first path 121 which is an inner half stretch of the U-shaped heat transfer tube 12, in order to expand a projection area 121A of the first path 121, the projection area 121A extending from the container 13 toward the center C, into a projection area 123A of the processed part 123, the projection area 123A extending from the container 13 toward the center C. This configuration enables the U-shaped heat transfer tube 12 to absorb more radiant heat for the expansion by the flattening or elliptical processing of the projection area 121A of the first path 121 into the projection area 123A of the processed part 123. Heat exchange efficiency may thus be improved.

Figure 6:
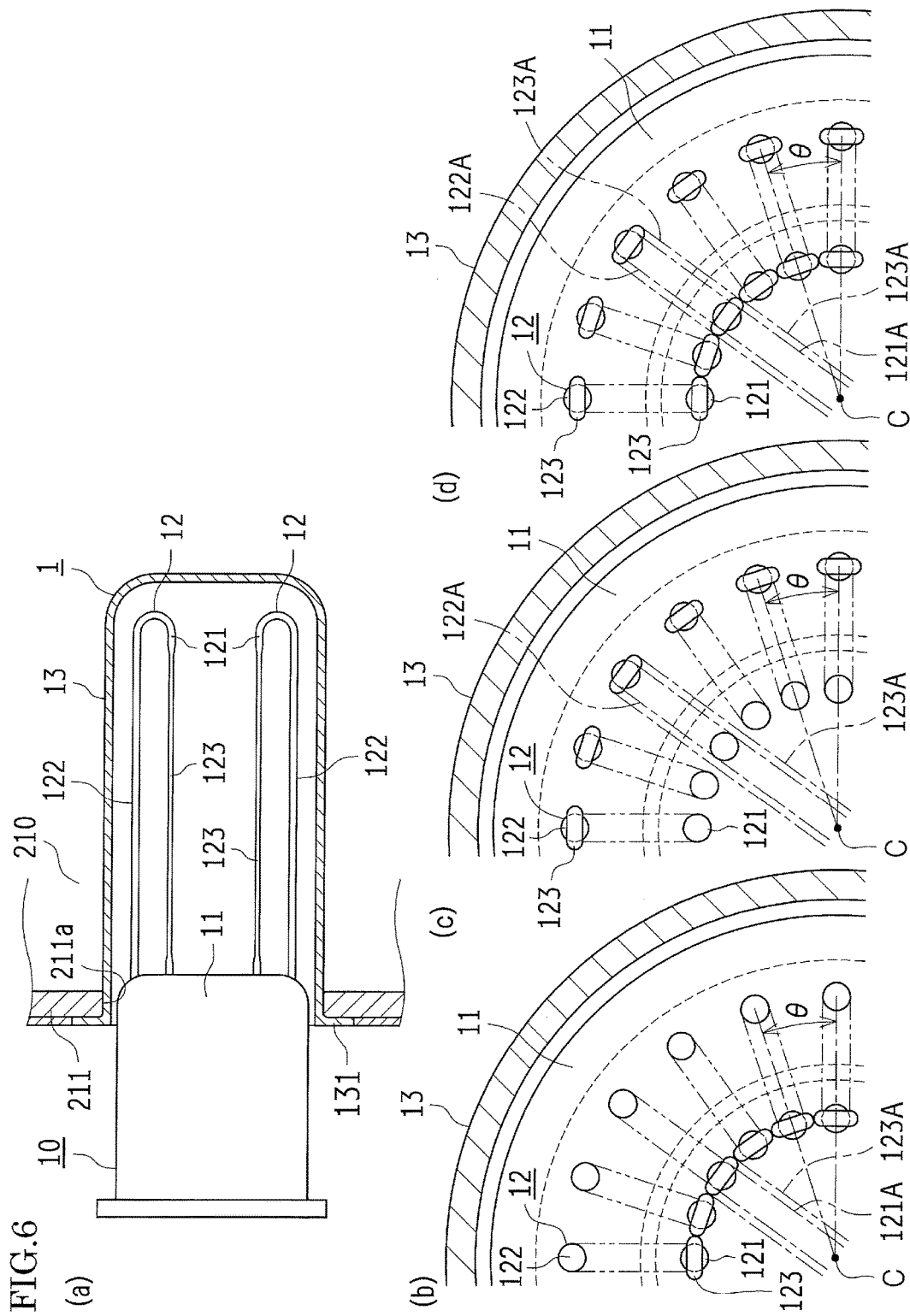
FIGS. 6(a) and 6(b) are a partial end view and a partial cross-sectional view, respectively, of still another embodiment of the radiant heat recovery heater in accordance with the present invention.
FIGS. 6(c) and 6(d) are partial cross-sectional views of yet still another embodiment for FIG. 6(b).

In this configuration, the first path 121, which is an inner half stretch of the U-shaped heat transfer tube 12, again preferably does not overlap the projection 122A of the second path 122, the projection 122A extending from the container 13 toward the center C. However, even if the first path 121 ever overlaps the projection 122A, the projection area 121A of the first path 121 through which radiant heat can be absorbed is still expanded into the projection area 123A of the processed part 123. Therefore, even if the first path 121 of the U-shaped heat transfer tube 12 is arranged with the same pitch angle θ without being offset from the position of the second path 122 as illustrated in FIG. 6, the configuration still achieves an increased radiant heat absorption effect over a similar configuration where no flattening or elliptical processing is involved.

The U-shaped heat transfer tube 12, as illustrated in FIG. 5, may therefore be configured so that the first path 121 of the U-shaped heat transfer tube 12 is offset from the second path 122 and processed into the processed part 123 (FIG. 5(b)), that the first path 121 is offset from the second path 122, and the second path 122 is processed into the processed part 123 (FIG. 5(c)), or that the first path 121 is offset from the second path 122, and both the first path 121 and the second path 122 are processed into the processed parts 123, 123 (FIG. 5(d)). Alternatively, the U-shaped heat transfer tube 12, as illustrated in FIG. 6, may be configured so that the first path 121 of the U-shaped heat transfer tube 12 is processed into the processed part 123 without being offset from the second path 122 (FIG. 6(b)), that the second path 122 is processed into the processed part 123 without the first path 121 being offset from the second path 122 (FIG. 6(c)), or that both the first path 121 and the second path 122 are processed into the processed parts 123, 123 without the first path 121 being offset from the second path 122 (FIG. 6(d)).

The heaters of the present embodiments are configured as the radiant heat recovery heater 1, in which the U-shaped heat transfer tubes 12 are covered with the container 13 to prevent the U-shaped heat transfer tubes 12 from corroding due to the exposure inside the combustion furnace 2. When the present invention is applied to a fluidized bed furnace or other like furnace that is not highly susceptible to corrosion, the U-shaped heat transfer tubes 12 are not necessarily covered with the container 13. In other words, the present invention is also applicable to non-radiation types of heaters in which the heat transfer tubes directly exchange heat with gas. In addition, the present invention is also applicable to non-heat-recovering, heat dissipation heaters (i.e., cold heaters).

The container 13 of the radiant heat recovery heater 1, covering the U-shaped heat transfer tubes 12, may be filled with inert gas for better corrosion prevention.

Figure 7:
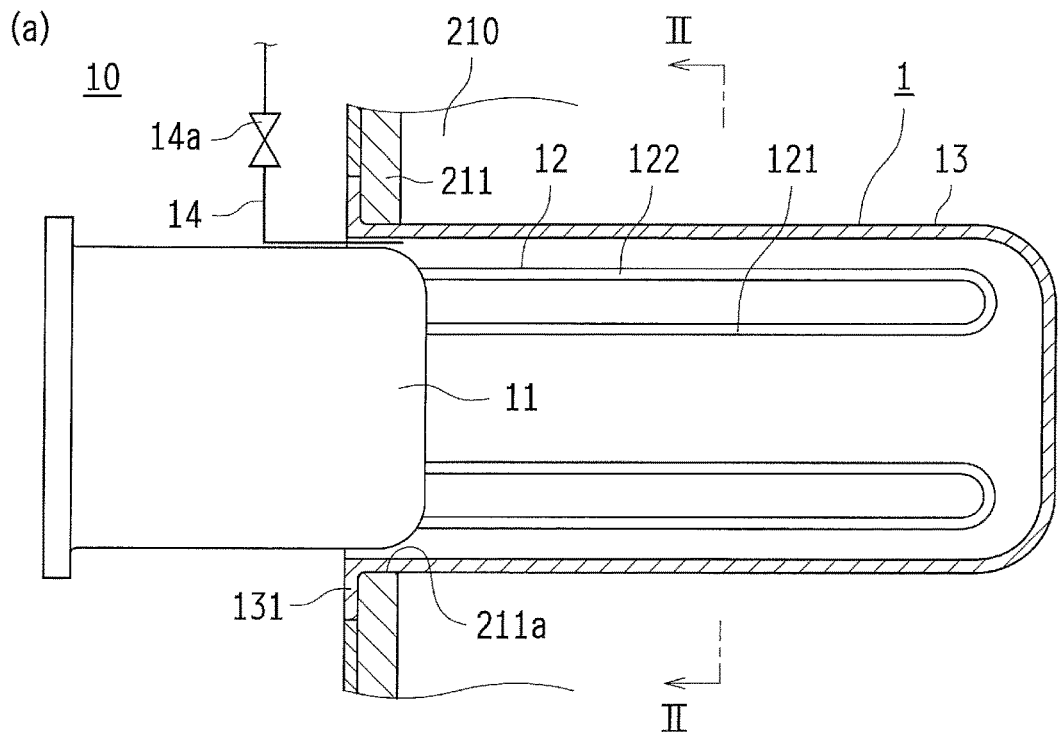
FIG. 7(a) is a partial end view showing an arrangement in relation to a further embodiment of the radiant heat recovery heater in accordance with the present invention.
FIG. 7(b) is a cross-sectional view taken along line II-II in FIG. 7(a).
Figure 7:
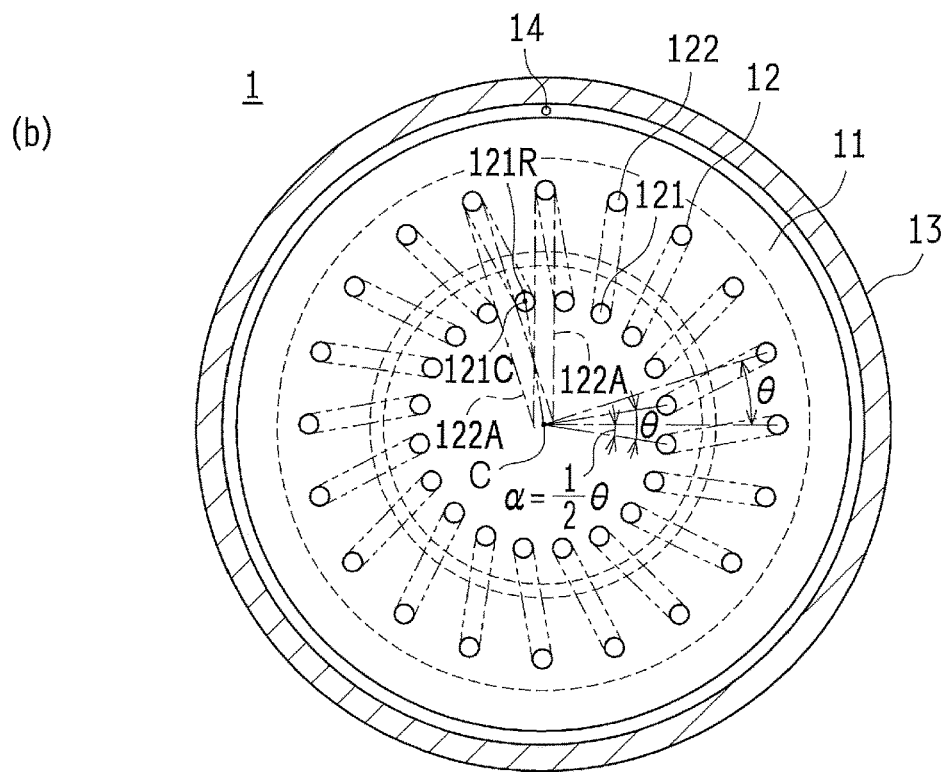

FIG. 7 illustrates a radiant heat recovery heater 1 equipped with an inert gas supply tube 14 through which inert gas is supplied into the internal space of a container 13 via a gap between the container 13 and a mounting section 11. The inert gas supply tube 14 is configured to fill the internal space of the container 13 with an inert gas from a tank or other source by opening/closing a valve 14a. The inert gas supply tube 14 may be disposed so that an inert gas supply opening faces the gap between the container 13 and the mounting section 11 and may also be extended therefrom into the container 13. The inert gas supply tube 14, when extended into the container 13, is made of stainless steel or another like material for resistance against the radiant heat from the container 13.

The inert gas to be used may be a noble gas such as gaseous helium or argon, a poorly reactive gas such as gaseous nitrogen or carbon, or a mixture of any of these gases.

In the radiant heat recovery heater 1 configured as above, the internal space of the container 13 where U-shaped heat transfer tubes 12 are disposed is filled with an inert gas fed through the inert gas supply tube 14 to replace air inside the container 13 with the inert gas. The inert gas reduces high temperature oxidation of the U-shaped heat transfer tubes 12 in the container 13 and thus protects the U-shaped heat transfer tubes 12, which gives improved durability to the U-shaped heat transfer tubes 12.

When helium gas is used as the inert gas, the U-shaped heat transfer tubes 12 in the container 13 exhibit improved natural-convection-based heat transfer, achieving a near 300 percent increase in heat transfer amount over air. The radiant heat recovery heater 1 can thus exhibit improved heat exchange performance.

Figure 8:
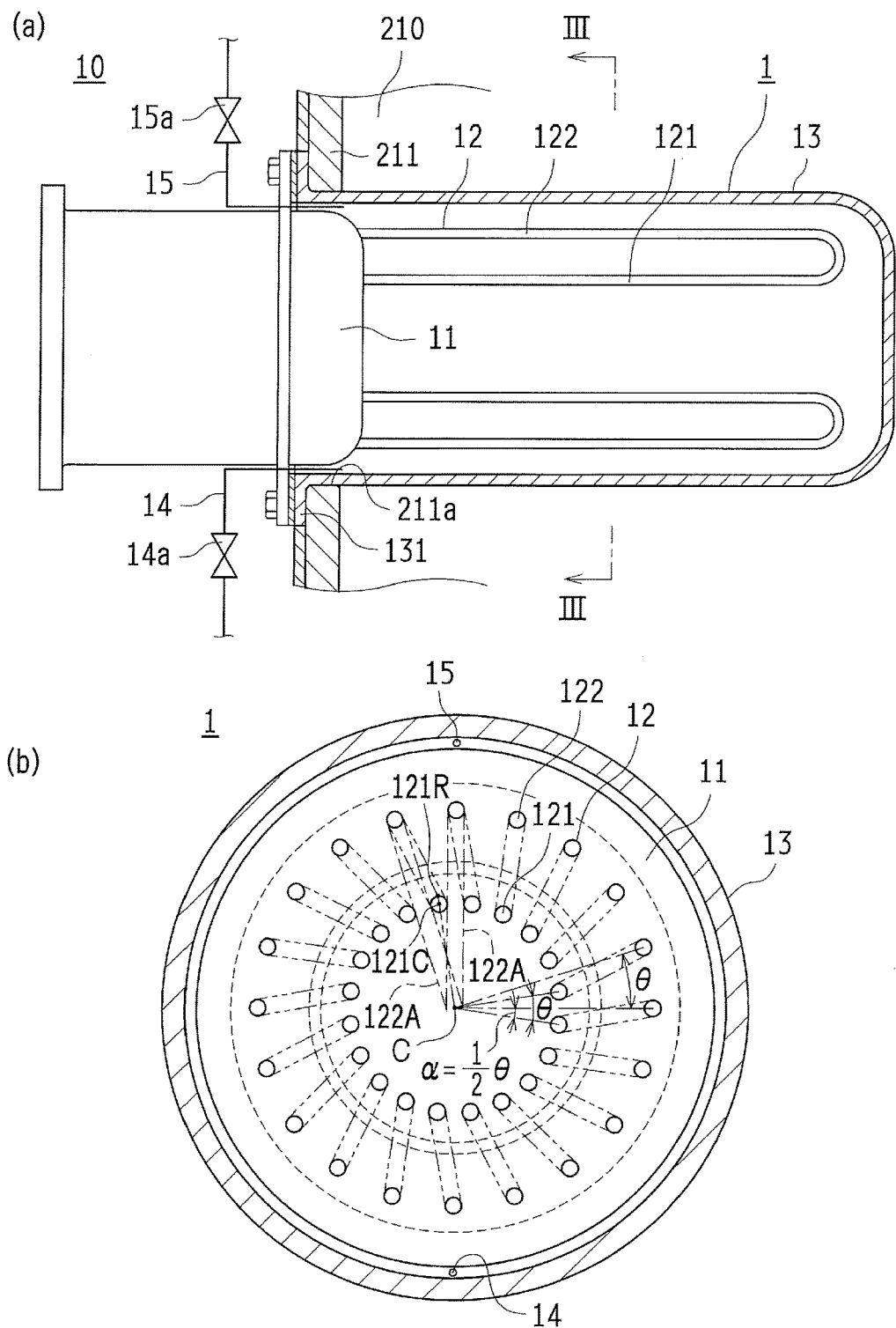
FIG. 8(a) is a partial end view showing an arrangement in relation to yet a further embodiment of the radiant heat recovery heater in accordance with the present invention.
FIG. 8(b) is a cross-sectional view taken along line in FIG. 8(a).

In the present embodiments, since the container 13 is a part of an open system with a gap between the container 13 and the mounting section 11, the atmospheric pressure condition can be maintained when the temperature of the container 13 rises. Alternatively, as illustrated in FIG. 8, the container 13 may be configured as a part of a sealed system by sealing the gap between the container 13 and a flange section 11a of the mounting section 11, so that the internal space of the container 13 can be pressurized. When this is the case, to prevent the container 13 from being damaged under thermal strain caused by temperature changes, the container 13 and the mounting section 11 are fixed together, for example, with a heat- and pressure-resistant gasket 3 interposed in the gap between the container 13 and the mounting section 11. Additionally, to prevent excessively high internal pressures, there is provided a pressure regulation valve 15a in piping 15 for the mounting section 11 for regulation of the internal pressure of the container 13.

In such a sealed configuration, simply supplying inert gas into the container 13 does not replace air inside the container 13 with the inert gas in a satisfactory manner. For this reason, when the container 13 is to be filled with an inert gas, the internal pressure of the container 13 may be reduced using the inert gas supply tube 14, the piping 15, or separately provided dedicated piping (not shown) before supplying the inert gas into the container 13 through the inert gas supply tube 14 to fill the container 13 with the inert gas.

Figure 9:
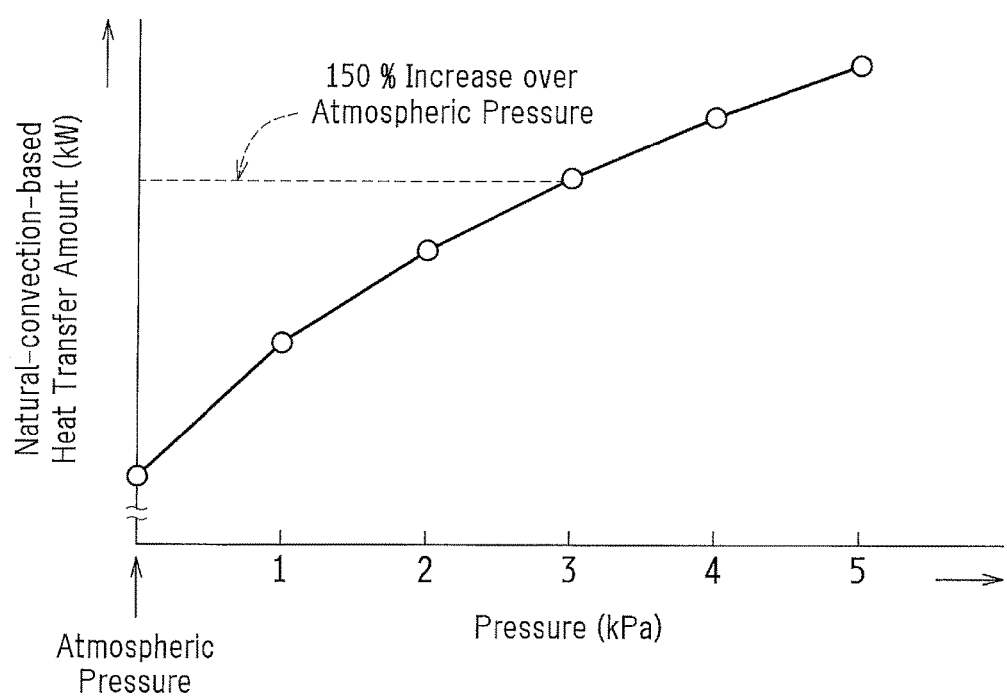
FIG. 9 is a graph representing a relationship between a natural-convection-based heat transfer amount and an internal pressure of a container for the radiant heat recovery heater in accordance with the present invention, the container being filled with inert gas.

Increasing the internal pressure of the container 13 in this manner permits the container 13 having an internal pressure increased by the inert gas to reduce high temperature oxidation and thus protect the U-shaped heat transfer tubes 12 as described earlier and also permits the U-shaped heat transfer tubes 12 to exhibit an improved natural-convection-based heat transfer amount. Therefore, when helium gas is used as the inert gas, the U-shaped heat transfer tubes 12 can achieve an approximately 150 percent or greater increase in heat transfer amount over a case where the container 13 is configured as an open system and filled with helium gas as can be seen from FIG. 9. This translates into an approximately 500 percent increase in heat transfer amount over a case where the container 13 is configured as an open system and filled with air. In other words, when helium gas is used as the inert gas, the invention achieves an improved natural-convection-based heat transfer amount both through the use of helium gas and through the sealed configuration of the container 13. The invention can thus achieve a far improved natural-convection-based heat transfer amount.

Since filling the container 13 with an inert gas in this manner can improve the durability and natural-convection-based heat transfer amount of the U-shaped heat transfer tubes 12, the radiant heat recovery heater 1 exhibits improved durability and heat recovery efficiency. Therefore, the Stirling engine 10 and the combustion furnace 2, incorporating the radiant heat recovery heater 1, can achieve improved outputs.

Furthermore, since filling the container 13 with an inert gas can improve the natural-convection-based heat transfer amount, the number of the U-shaped heat transfer tubes 12 in the container 13 can be reduced while maintaining approximately the same level of output as the container 13 filled with no inert gas. That allows for reduction in size of the radiant heat recovery heater 1 and hence of the Stirling engine 10 incorporating the radiant heat recovery heater 1. In addition, since the combustion furnace 2 incorporating the Stirling engine 10 allows for reduction in size of the radiant heat recovery heater 1 of the Stirling engine 10, the combustion furnace 2 can be installed in a limited space 240.

Figure 10:
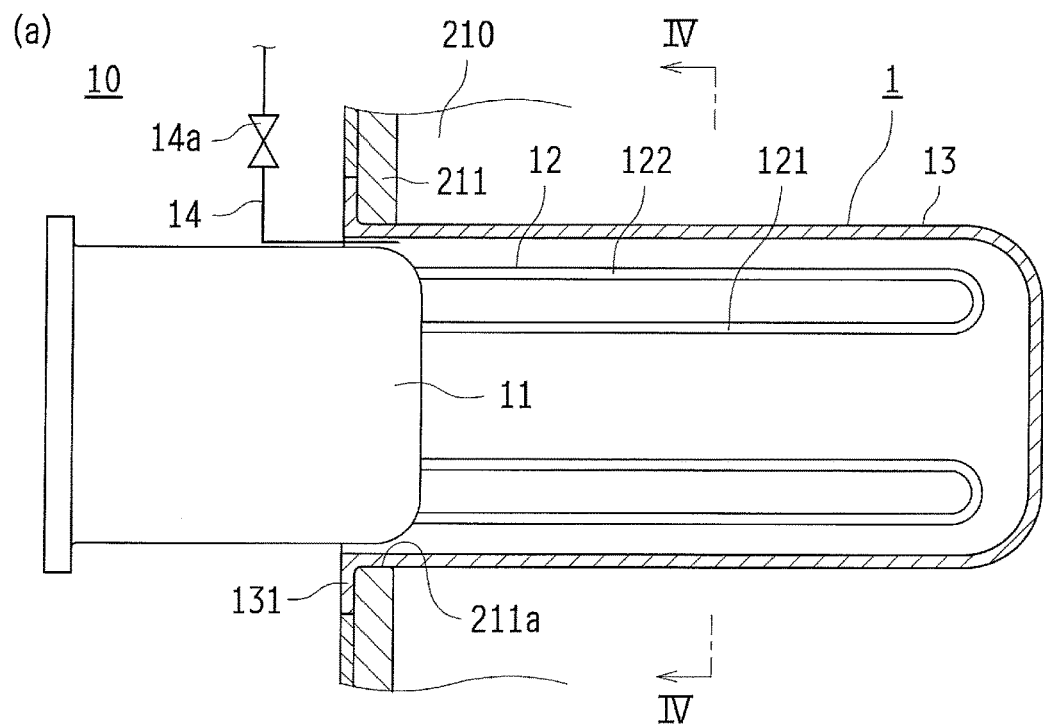
FIG. 10(a) is a partial end view of still a further embodiment of the radiant heat recovery heater shown in FIG. 7.
FIG. 10(b) is a cross-sectional view taken along line IV-IV in FIG. 10(a).
Figure 10:
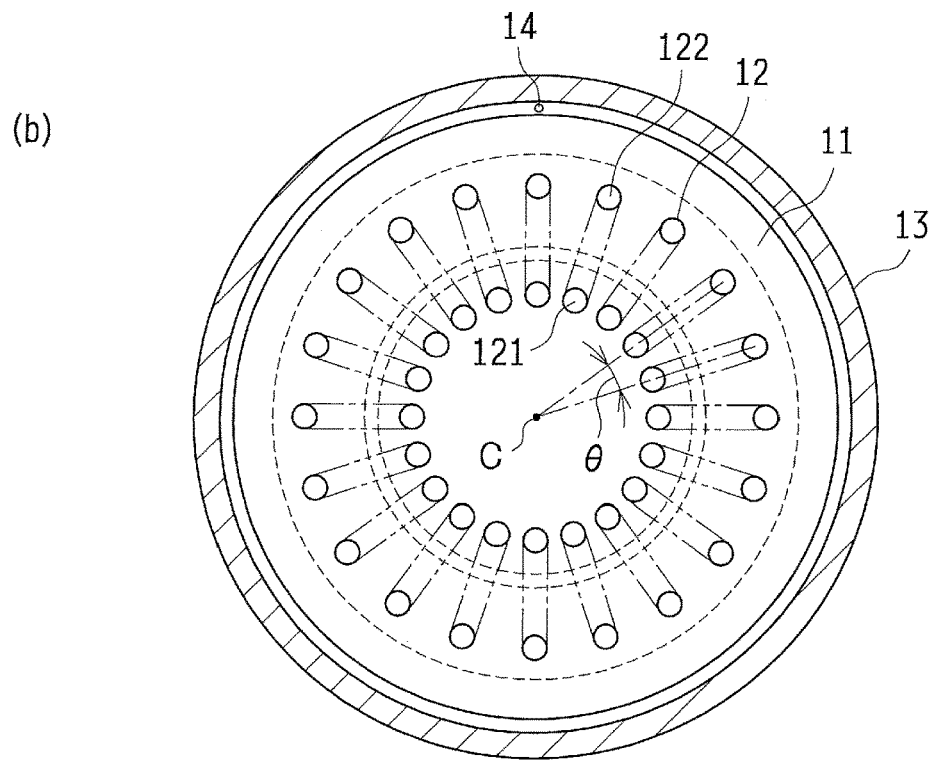
Figure 11:
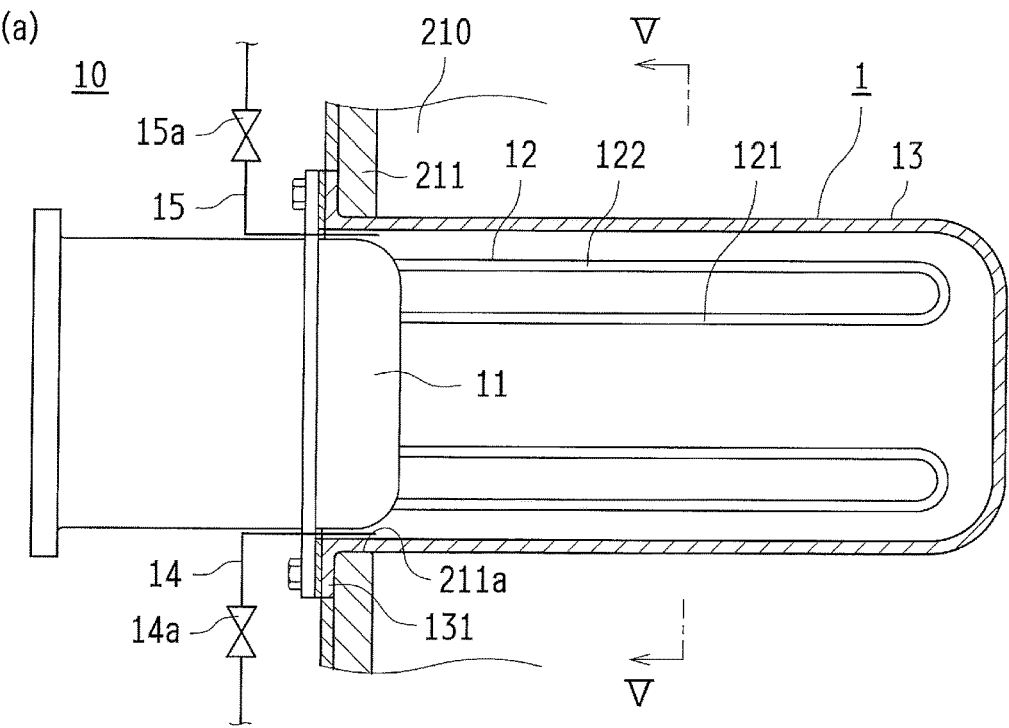
FIG. 11(a) is a partial end view of yet still a further embodiment of the radiant heat recovery heater shown in FIG. 8.
FIG. 11(b) is a cross-sectional view taken along line V-V in FIG. 11(a).
Figure 11:
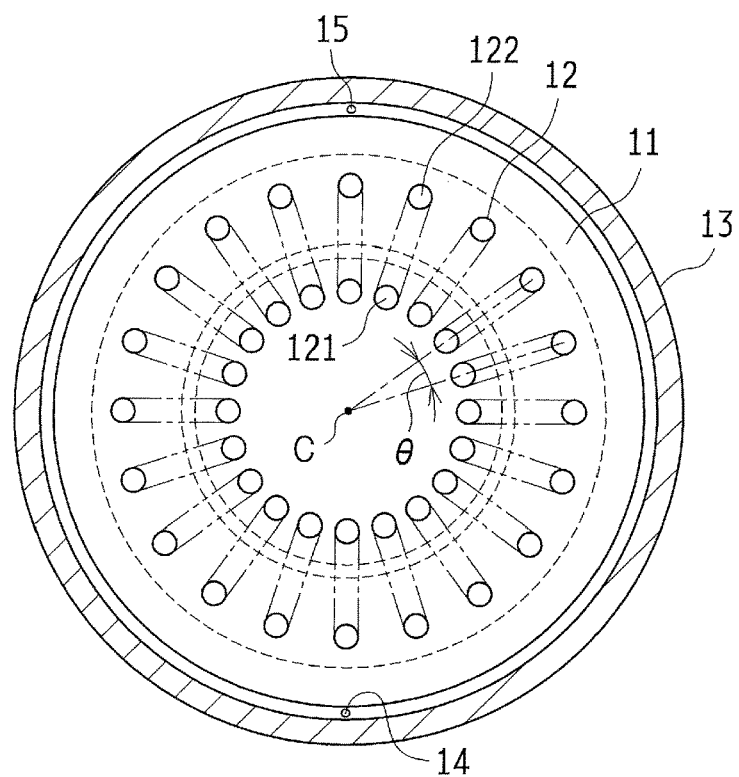

In the present embodiments, the radiant heat recovery heater 1 includes the U-shaped heat transfer tubes 12 in the container 13. The U-shaped heat transfer tubes 12 are not limited in shape, number, and arrangement in any particular manner. Various heat transfer tubes can be employed that are used in the same or similar types of radiant heat recovery heaters as the radiant heat recovery heater 1. Therefore, the U-shaped heat transfer tubes 12 shown in FIGS. 7 and 8 may be formed to have such various shapes as illustrated in FIGS. 5 and 6. Additionally, the U-shaped heat transfer tubes 12 shown in FIGS. 7 and 8 are configured to readily absorb radiant heat by arranging each first path 121, located closer to the center C, on the mounting section 11 at an angular position, α, offset from the position of the associated second path 122 by an angle of ½θ, which is half the pitch angle θ. Alternatively, the U-shaped heat transfer tubes 12 may be configured, as illustrated in FIGS. 10 and 11, so that each first path 121 is arranged with no offset in pitch angle θ from the associated second path 122. When this is the case, the inert gas filling the container 13 still has the same or similar effects, which can improve the durability and heat transfer efficiency of the U-shaped heat transfer tubes 12.

REFERENCE SIGNS LIST

1 Radiant Heat Recovery Heater
10 Stirling Engine
11 Mounting Section
12 U-shaped Heat Transfer Tube
121 First Path
122 Second Path
122A Projection
123 Processed Part
123A Projection
13 Container
14 Inert Gas Supply Tube (Inert Gas Supply Path)
15a Pressure Regulation Valve
2 Combustion Furnace
210 Empty Space
θ Pitch Angle
α Angle

The invention claimed is:
1. A system comprising:
a radiant heat recovery heater comprising:
  a mounting section; and
  a plurality of heat transfer tubes arranged on the mounting section and housed in a container, the plurality of heat transfer tubes configured to absorb radiant heat from the container when the container is exposed to high temperature, each heat transfer tube of the plurality of heat transfer tubes comprising a first path and a second path, wherein:
    the container has a bottom cylindrical shape and is provided such that a gap open to the atmosphere is formed between an opening rim of the container and the mounting section;
    the first paths are arranged to form an arrangement pitch circle having a first diameter, and the second paths are arranged to form an arrangement pitch circle having a second diameter, the first diameter smaller than the second diameter;
    the first paths and the second paths of the heat transfer tubes are arranged on the mounting section at equal intervals with a pitch angle; and
    the first paths are each arranged on the mounting section at a position offset from the pitch angle of the second paths by half the pitch angle, so as not to completely overlap a projection of that second path, the projection extending from the container toward a center of the container.

2. The system according to claim 1, wherein:
for each heat transfer tube of the plurality of heat transfer tubes:
  the first path associated with one of an outward path and a return path for a heat medium, and
  the second path associated with the other of the outward path and the return path;
each heat transfer tube of the plurality of heat transfer tubes comprising a U-shape in which the first path is coupled to the second path; and
the center corresponds to a longitudinal axis of the container.

3. The system according to claim 1, wherein the container is configured to be filled with an inert gas.

4. The system according to claim 3, further comprising an inert gas supply path configured to supply the inert gas into the container.

5. The system according to claim 3, wherein the inert gas comprises helium.

6. The system according to claim 1, further comprising:
a stirling engine comprising the radiant heat recovery heater configured as a high-temperature-side heat exchanger.

7. The system according to claim 6, wherein:
for each heat transfer tube of the plurality of heat transfer tubes:
the first path is associated with one of an outward path and a return path for a heat medium, and
the second path is associated with the other of the outward path and the return path;
each heat transfer tube of the plurality of heat transfer tubes comprising a U-shape in which the first path is coupled to the second path; and
the center corresponds to a longitudinal axis of the container.

8. The system according to claim 6, wherein the container is configured to be filled with an inert gas.

9. The system according to claim 8, further comprising an inert gas supply path configured to supply the inert gas into the container.

10. The system according to claim 1, further comprising:
a combustion furnace comprising the radiant heat recovery heater, the radiant heat recovery heater exposed to an empty space inside the combustion furnace.

11. The system according to claim 10, wherein:
for each heat transfer tube of the plurality of heat transfer tubes:
the first path is associated with one of an outward path and a return path for a heat medium, and
the second path is associated with the other of the outward path and the return path;
each heat transfer tube of the plurality of heat transfer tubes comprising a U-shape in which the first path is coupled to the second path; and
the center corresponds to a longitudinal axis of the container.

12. The system according to claim 10, wherein the container is configured to be filled with an inert gas.

13. The system according to claim 12, further comprising an inert gas supply path configured to supply the inert gas into the container.

14. The radiant heat recovery heater according to claim 1, wherein the first paths of the heat transfer tubes, the second paths of the heat transfer tubes, or both of the first paths and the second paths comprise flatly or elliptically processed parts enlarged along the projection, to increase a projection area extending from the container toward the center of the container.

15. A system comprising:
a radiant heat recovery heater comprising:
a mounting section; and
a plurality of heat transfer tubes arranged on the mounting section and housed in a container, the plurality of heat transfer tubes configured to absorb radiant heat from the container when the container is exposed to high temperature, each heat transfer tube of the plurality of heat transfer tubes comprising a first path and a second path, wherein:
the container has a bottom cylindrical shape and is provided such that a gap open to the atmosphere is formed between an opening rim of the container and the mounting section;
the first paths are arranged to form an arrangement pitch circle having a first diameter, and the second paths are arranged to form an arrangement pitch circle having a second diameter, the first diameter smaller than the second diameter; and
the first paths of the heat transfer tubes, the second paths of the heat transfer tubes, or both of the first paths and the second paths comprise flatly or elliptically processed parts enlarged along a projection extending from the container toward a center of the container, to increase a projection area extending from the container toward the center of the container.

16. The system according to claim 15, wherein the first paths and the second paths of the heat transfer tubes are arranged on the mounting section at equal intervals with a pitch angle.

17. The system according to claim 15, further comprising:
a stirling engine comprising the radiant heat recovery heater configured as a high-temperature-side heat exchanger.

18. The system according to claim 15, further comprising:
a combustion furnace comprising the radiant heat recovery heater, the radiant heat recovery heater exposed to an empty space inside the combustion furnace.

* * * * *